United States Patent

[11] 3,630,688

| [72] | Inventors | Teruo Takiguchi;<br>Yoshihisa Fujimoto; Yoshio Kimura; Iwao Terasaki, all of Nobeoka-shi, Japan |
|---|---|---|
| [21] | Appl. No. | 866,326 |
| [22] | Filed | Oct. 14, 1969 |
| [45] | Patented | Dec. 28, 1971 |
| [73] | Assignee | Asahi Kasei Kogyo Kabushiki Kaisha<br>Osaka, Japan |
| [32] | Priority | Nov. 27, 1968 |
| [33] | | Japan |
| [31] | | 43/86336 |

[54] POLYMERIZATION APPARATUS
11 Claims, 5 Drawing Figs.

[52] U.S. Cl. ..................................... 23/285,
260/75 M, 260/95 R, 260/94.9 P, 159/11 B, 259/9,
259/10, 259/25, 259/109, 259/110, 261/90,
261/92
[51] Int. Cl. ..................................... B01j 1/00,
C08f 1/98
[50] Field of Search .......................... 23/285;
159/25 A, 11 B; 259/9, 10, 25, 26, 45, 46, 109,
110; 260/75 M; 261/90, 92

[56] References Cited
UNITED STATES PATENTS
1,302,281  4/1919  Bates, Jr. ..................... 261/92

2,869,838  1/1959  Ryder ........................... 259/9
3,279,895  10/1966  Howe ........................... 23/285

*Primary Examiner*—James H. Tayman, Jr.
*Attorney*—Flynn & Frishauf

ABSTRACT: An apparatus for continuously producing polymer having high degree of polymerization, comprising a substantially cylindrical vessel disposed in a substantially horizontal plane, said vessel having an inlet at its one end for supplying liquid reactant thereinto, an outlet at its other end for discharging polymer therefrom and a port or ports at its one or both ends or adjacent thereto for removing gas therefrom, and an agitator rotatably mounted in said vessel, said agitator including a pair of rotating shafts extending through end plates of the vessel on a central axis thereof, a pair of discs having diameter slightly smaller than the inside diameter of said vessel and connected to the inner ends of said rotating shafts, respectively, a plurality of rods extending in parallel with the central axis and connecting said discs and plurality of agitating members supported by said rods at spaced relationship in the vessel, each of said agitating members being made of an element constituting at least a part of a frustoconical member and having open ends, the bases of the agitating members being disposed at the outlet side of the vessel and their imaginary apex being disposed at the inlet side of the vessel.

PATENTED DEC 28 1971
3,630,688
SHEET 1 OF 2
FIG. 1
FIG. 2
FIG. 3
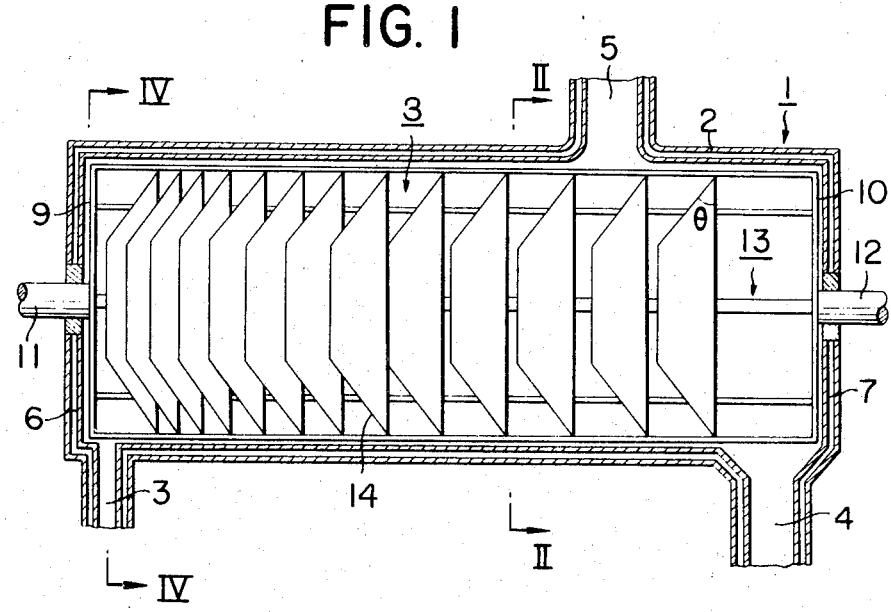
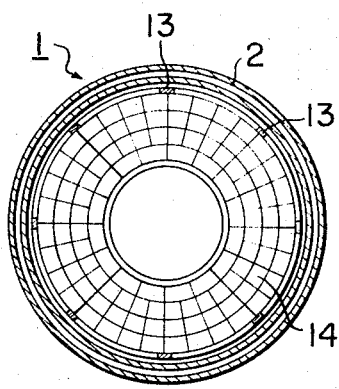
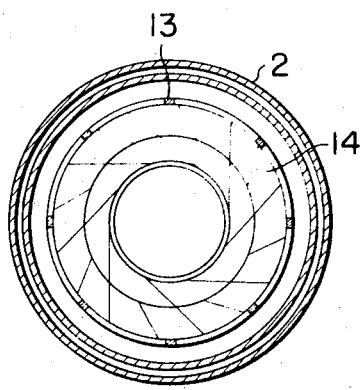
INVENTOR
BY
ATTORNEY

A  B  C

INVENTOR

BY

ATTORNEY

POLYMERIZATION APPARATUS

BACKGROUND OF THE INVENTION

The present invention relates to an apparatus for producing polymer having a high degree of polymerization by continuously performing polymerization reaction while removing byproduced material having low molecular weight.

In order to continuously perform polymerization reaction to obtain polymer of good and uniform quality, it is necessary to keep the staying time of liquid reactant in a reactor as uniform as possible, and for such purpose it is necessary to convey the liquid reactant from an inlet to an outlet of the reactor in stable manner. Furthermore, in order to advance polymerization reaction while removing byproduced volatile material, it is necessary to keep the surface area of the liquid reactant as large as possible and to constantly renew the surface of the reactant so as to promote the diffusion of the byproduced material of low molecular weight. It is also necessary to uniformly mix the liquid reactant. For example, polyethylene terephthalate can be produced by such continuous polymerization of bis-$\beta$-hydroxyethyl terephthalate at proper temperature and under reduced pressure, while removing byproduced ethylene glycol.

Heretofore such continuous polymerization reaction has been carried out in a cylindrical reactor vessel including a shaft or shafts on which agitating members, such as screw, discs, grids or wire gauzes are mounted. The rotation of the agitating members acts to constantly renew the surface of the liquid reactant so as to promote the diffusion of the byproduced volatile material and agitate the liquid reactant to advance the polymerization reaction, while conveying and agitating the liquid reactant by means of the screws or the like.

However, the conveying rate of the screw is substantially constant depending on the pitch and the rotating speed thereof, so that at a higher rotating speed the screw has an excessively high conveying rate, with the result that the liquid reactant conveyed thereby tends to flow backward at the outlet of the reactor toward the inlet, thereby reducing the viscosity of the polymer produced at a lower rotating speed the action of renewing the surface of the liquid reactant is reduced accordingly. In order to prevent the liquid reactant from flowing backward at the outlet of the reactor its has been proposed to partition the reaction vessel by means of weirs, which tend to cause stagnation of the liquid reactant in the reactor.

Accordingly, in a reactor including an agitator provided with a screw, a stable operation can be obtained only within very narrow ranges of the operating conditions which have been determined in consideration of the conveying action and the surface renewing action of the screw, and thus the reactor lacks versatility in operation. Furthermore, as the viscosity of the polymer produced is increased, the liquid reactant raised from the liquid level in the reactor by the rotating grids, wire gauzes or the like tends to stick to the surface of the latter in a semisolid state so that it can hardly flow downward on said surface. Thus the liquid reactant sticking to the rotating grids, wire gauzes or the like reenter into the liquid in the reactor as it is, so that the surface renewing action is reduced and the reaction cannot be efficiently performed to a satisfactory degree of polymerization.

The inventors have invented an improved agitator, as disclosed in Japanese Pat. application Ser. No. 53529/1968, which avoided the above-mentioned disadvantages, but it has been found that this agitator is still unsatisfactory. The agitator disclosed in said Japanese Pat. application Ser. No. 53529/1968 comprises a plurality of agitating members in the form of a truncated cone or a part thereof, with its base being disposed toward an inlet of the reactor and with its apex being disposed toward an outlet of the reactor. In such an agitator it has been found preferable that an exhaust port is arranged at the outlet area of the reactor since the exhaust system is hardly clogged in operation, but if the exhaust port is arranged at the outlet area of the reactor, the gas flows in a smooth stream from the inlet to the outlet of the reactor since the diameters of the agitating members successively decrease in the same direction as that of the gas stream, so that the foams and the scattered material of low molecular weight produced near the inlet of the reactor under highly vacuum condition are conveyed along with the gas stream to the outlet area where they are mixed with the liquid reactant, thereby decreasing the degree of polymerization of the final product and casing irregularities in quality thereof.

SUMMARY OF THE INVENTION

It is an object of the present invention to provide an improved apparatus for continuously producing polymer, particularly polymer having high viscosity, in which the above-mentioned disadvantages are completely removed.

In accordance with the present invention there is provided an apparatus for continuously producing polymer of high degree of polymerization, comprising a substantially cylindrical reactor vessel of circular or oval cross section having a central axis disposed in a substantially horizontal plane, said vessel including an inlet at its one end for supplying liquid reactant thereinto, an outlet at its other end for discharging polymer therefrom and a rotating or ports at its end or both ends or adjacent thereto for removing gas therefrom, and an agitator rotatably mounted in said reactor vessel, said agitator including a pair of rotating shafts extending through opposite ends of said vessel on the central axis thereof, a pair of discs having a diameter slightly smaller than the inside diameter of said vessel and connected to the inner ends of said rotating shafts, respectively, a plurality of rods extending in parallel with said central axis and fixed to the periphery of said discs and a plurality of agitating members arranged in spaced relationship in said vessel and fixed at their peripheries to said rods, each of said agitating members being made of an element constituting at least a part of a frustoconical member and having open ends, their bases being directed toward the outlet of the vessel and their imaginary apex being directed toward the inlet thereof.

In the apparatus according to the invention, the liquid reactant raised from the liquid level by the rotating agitating member flows downward in the form of a film on the surface of the agitating member or drips downward, and consequently the liquid reactant is developed to a large surface area which is constantly renewed as the agitating member is rotated. Furthermore, the liquid reactant is moved in a complicated manner in the longitudinal direction as well as in the transverse direction by the agitating members which are arranged at angles with respect to the axis of the vessel, whereby the liquid reactant is subjected to considerable agitating effect and is uniformly retained in the vessel for the proper length of time, without causing short-circuiting of the liquid in the vessel.

BRIEF DESCRIPTION OF THE DRAWINGS

The drawings illustrate preferred embodiment of the present invention in which:

FIG. 1 is an embodiments sectional view showing a horizontal, cylindrical reactor vessel according to an embodiment of the invention;

FIG. 2 is a cross-sectional view taken along line II—II in FIG. 1;

FIG. 3 is a cross-sectional view, similar to FIG. 2, showing a modified form;

PREFERRED EMBODIMENT

Figure 4:
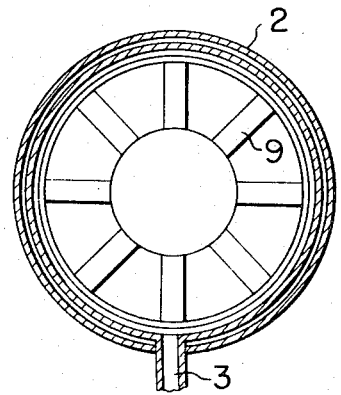
FIG. 4 is a cross-sectional view taken along line IV—IV in FIG. 1.

Now the invention will be explained with reference to the drawings, which illustrate preferred embodiments of the present invention.

Referring to FIG. 1, the reactor vessel 1 is surrounded with reactant heating jacket 2 and is provided at its one end with an inlet 3 for supplying liquid reactant into said reactor and at its other end with an outlet 4 for discharging the polymerization product therefrom. The reactor vessel 1 is further provided with a gas-removing port 5 which communicates with a high-vacuum system. If desired, two or more gas-removing ports may be provided.

The reactor vessel 1 has end plates 6 and 7 at its opposite ends, which rotatably support axially extending shafts 11 and 12, respectively, which are connected to grid discs or perforated discs 9 and 10, respectively, of an agitator generally designated by numeral 8. The shafts 11 and 12 are adapted to be rotated by suitable driving means (not shown).

The agitator 8, as shown in FIG. 1, consists of the rotating shafts 11 and 12 extending on the central axis of said reactor, the two discs 9 and 10 constructed from perforated or grid plate connected to said rotating shafts 11 and 12, respectively, and having diameter slightly smaller than the internal diameter of the reactor, a plurality of rods 13 extending in parallel with the central axis of the reactor and connected to said discs 9 and 10, and a plurality of agitating members 14 arranged with a predetermined spaced relationship along the axis of the reactor vessel and fixed at their peripheries to the rods 13, each of said agitating members being made of a frustoconical wire gauze, grid or the like with its base having a diameter slightly smaller than the inside diameter of the reactor.

Figure 5:
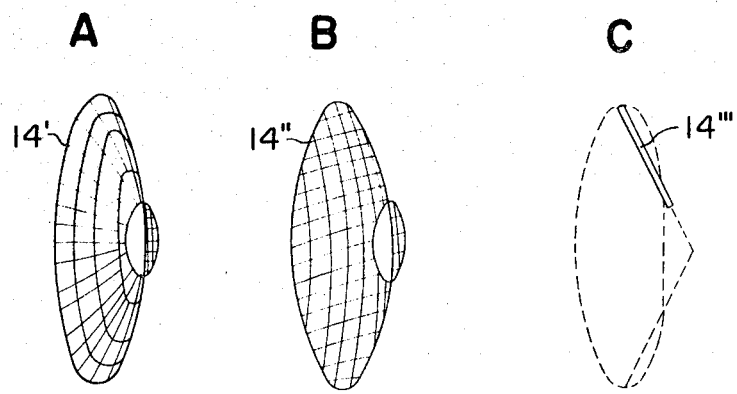
FIGS. 5A, B and C show various forms of a frustoconical agitating member, respectively.

FIG. 5 illustrates various examples of the agitating member. The agitating member 14' shown in FIG. 5A is made of a frustoconical wire gauze with its base having a diameter slightly smaller than the inside diameter of the reactor. The agitating member 14" shown in FIG. 5B is made of a frustoconical grid having a shape similar to that shown in FIG. 5A. The wire gauze and the grid have gradually increased sizes of meshes as the viscosity of the liquid reactant is increased. Assuming that $\theta$ indicates an angle included between a straight line including a point on the base circle of the truncated cone and an imaginary apex of the latter and latter plane including said base circle, this angle $\theta$ may be so arranged that the angle $\theta$ of the respective agitating members is successively increased as the viscosity of the liquid reactant is increased. The agitating member 14''' as shown in FIG. 5C consists of a rod or the like disposed at an angle with the central axis.

The wire gauze and the grid as shown in FIGS. 5A and B may be so constructed that they positively feed the liquid reactant toward the outlet. Such a construction is shown in FIG. 3, in which the agitating member must be rotated in a predetermined direction, that is, in the clockwise direction in FIG. 3.

Since the agitating member 14' as well as 14" is made of a wire gauze or grid of fine wires lying at an angle $\theta$ with respect to the plane of the base, the agitating member acts to permit the liquid reactant to be raised from the liquid level and then dropped into the liquid. Even if the liquid reactant has relatively high viscosity, it can easily drop from the meshes of the wire gauze or grid. Thus the action of exposing the liquid reactant to gaseous atmosphere, that is, the surface renewing action is much improved, and the action of agitating the liquid reactant is also superior.

Since the frustoconical agitating member is so arranged that its base circle is directed to the outlet of the reactor and its imaginary apex is directed to the inlet so that the diameter of the agitating member is gradually decreased in the opposite direction to the flowing direction of the gas, the foaming of the liquid material mainly produced at the inlet area of the vessel or the scattered mist of the liquid reactant entrapped and conveyed by the gas stream is effectively caught by the agitating members or the spaces between the agitating members, so that the foaming cannot extend to the whole area of the reactor vessel and the clogging of the exhaust system by the foams and the scattered mist of the liquid reactant can be effectively avoided.

It has been found that the agitator consisting of the frustoconical agitating members arranged as above can maintain a substantially horizontal plane of the liquid level and perform smooth conveying action, in the same manner as experienced in the apparatus according to the above-mentioned Japanese Pat. application Ser. No. 53529/1968. It has been found that this agitator can satisfactorily convey liquids having high viscosity such as 30,000 poise.

The angle $\theta$ is selected in the range from 5° to 60°. The agitating members are preferably arranged in a reaction vessel such that the members successively increased angles $\theta$ from the inlet to the outlet as the reactant liquid increases its viscosity. Preferably the radius of the minor circle of the frustoconical member is selected within the range from two-thirds to one-fifth of the radius of the reactor vessel. In the case of the rod forming a part of the frustoconical member, the distance between the inner end of the rod and the central axis of the vessel is preferably selected in the range from two-thirds to one-fifth of the radius of the vessel.

We claim:

1. Apparatus for continuously producing polymer of high degree of polymerization, comprising a substantially cylindrical reactor vessel having a central axis disposed in a substantially horizontal plane, said vessel including an inlet at one end thereof for supplying liquid reactant thereinto, an outlet at the other end thereof for discharging polymer therefrom and at least one port for removing gas therefrom and an agitator rotatably mounted in said reactor vessel, said agitator including a pair of rotating shafts extending through opposite ends of said vessel on the central axis thereof, a pair of discs having a diameter slightly smaller than the inside diameter of said vessel and connected to the inner ends of said rotating shafts, respectively, a plurality of rods extending in parallel with said central axis and fixed to the periphery of said discs and a plurality of agitating members arranged in spaced relationship in said vessel and fixed at their peripheries to said rods, each of said agitating members comprising at least a part of a frustoconical member and having open ends, the base of each of said agitating members being directed toward the outlet of said vessel and the imaginary apex of each of said agitating members being directed toward the inlet of said vessel.

2. Apparatus according to claim 1, in which an agitating member is comprised of wire gauze.

3. Apparatus according to claim 1, in which an agitating member is comprised of a wire grid.

4. Apparatus according to claim 1, in which an agitating member comprises a rod which forms said part of said frustoconical member.

5. Apparatus according to claim 1 in which said frustoconical members have an angle $\theta$ selected within the range of from 5° to 60°.

6. Apparatus according to claim 2, in which said frustoconical members have a minor circle having a diameter selected within the range of from one-fifth to two-thirds of the diameter of said reactor vessel.

7. Apparatus according to claim 2, in which said wire gauze of said agitating members has a mesh size within the range of from 5 mm. to 40 mm., said agitating members being arranged in said reactor vessel such that the mesh sizes gradually increase from the inlet to the outlet of said vessel.

8. Apparatus according to claim 1, in which said frustoconical agitating members are arranged in said reactor vessel with the spacing between adjacent members being within the range of from 25 mm. to 200 mm., said spacings being successively increased from the inlet to the outlet of said reactor vessel.

9. Apparatus according to claim 3, in which said wire grid of said agitating members has a mesh size within the range of from 5 mm. to 40 mm., said agitating members being arranged in said reactor vessel such that the mesh sizes gradually increase from the inlet to the outlet of said vessel.

10. Apparatus according to claim 1 wherein said vessel has a circular cross section.

11. Apparatus according to claim 1, in which an agitating member is comprised of a wire mesh.

* * * * *